United States Patent [19] — Giezendanner
[11] 4,448,282
[45] May 15, 1984

[54] LADDER FORMED AS A MULTIPLE-PURPOSE DEVICE

[76] Inventor: Ruedi Giezendanner, Rosenstrasse 16, CH-6010 Kriens, Switzerland

[21] Appl. No.: 441,293

[22] Filed: Nov. 12, 1982

[30] Foreign Application Priority Data

Nov. 13, 1981 [CH] Switzerland ........................ 7314/81

[51] Int. Cl.³ ........................ B62B 1/20; E06C 1/397; E06C 1/04

[52] U.S. Cl. ........................................ 182/22; 182/16; 182/165

[58] Field of Search ........................ 182/20, 22, 21, 16, 182/165; 280/30, 659

[56] References Cited

U.S. PATENT DOCUMENTS

| | | | |
|---|---|---|---|
| 1,116,779 | 11/1914 | Witt | 280/30 |
| 1,423,366 | 7/1922 | Snook | 280/30 |
| 3,104,889 | 11/1963 | Branch | 182/20 |
| 3,111,193 | 11/1963 | McKinnie | 182/22 |
| 3,954,155 | 5/1976 | Guidara | 182/20 |
| 4,106,590 | 5/1978 | Tarran | 182/20 |
| 4,258,826 | 3/1981 | Murray | 182/20 |

FOREIGN PATENT DOCUMENTS

| | | | |
|---|---|---|---|
| 491278 | 5/1970 | Switzerland . | |
| 538043 | 6/1973 | Switzerland . | |
| 611971 | 6/1979 | Switzerland . | |
| 444967 | 4/1936 | United Kingdom | 182/22 |
| 1288251 | 9/1972 | United Kingdom | 182/20 |

*Primary Examiner*—R. P. Machado
*Attorney, Agent, or Firm*—Bernard, Rothwell & Brown

[57] ABSTRACT

The ladder includes two separate ladder elements, which are pivotable and slidable relative to each other and can also be completely separated from each other. It can be used as a step-ladder and as a leaning type ladder. The ladder element is equipped with wheels, in order to simplify the transport of the collapsed ladder. In addition, an outwardly pivotable support plate is arranged between the wheels, so that the ladder element can serve as a hand truck, whereby the bent ends of the side beams serve as hand grips. The ladder has a simple construction and can be used in many ways in household use and in commercial operations.

5 Claims, 11 Drawing Figures

Figure 5:
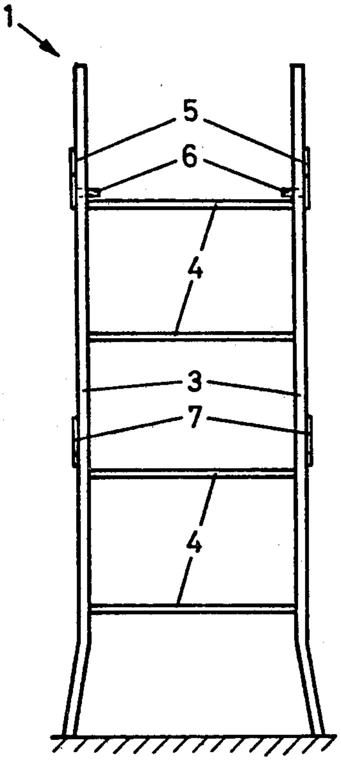

Fig. 1
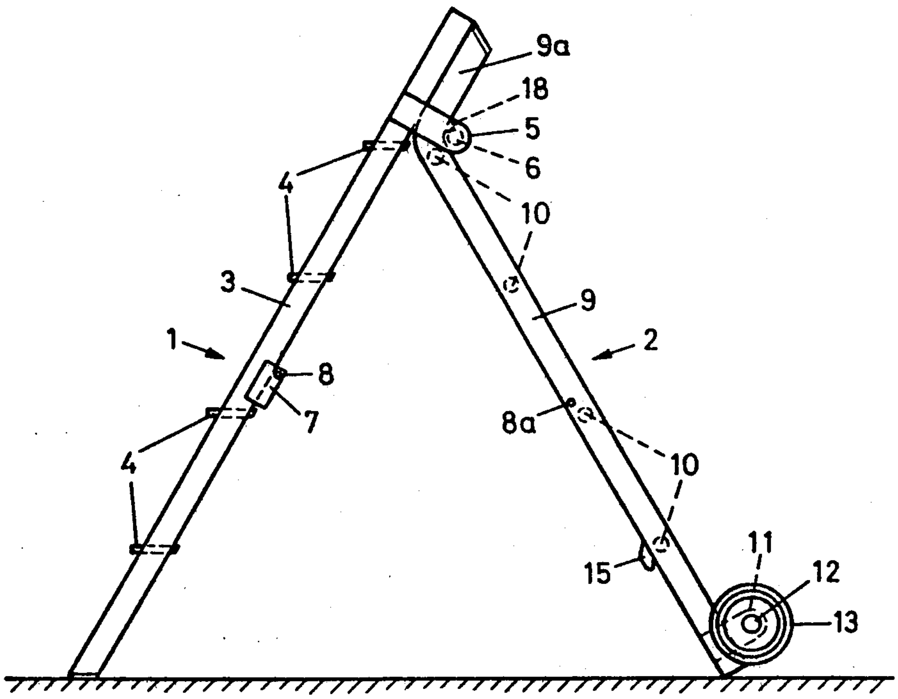
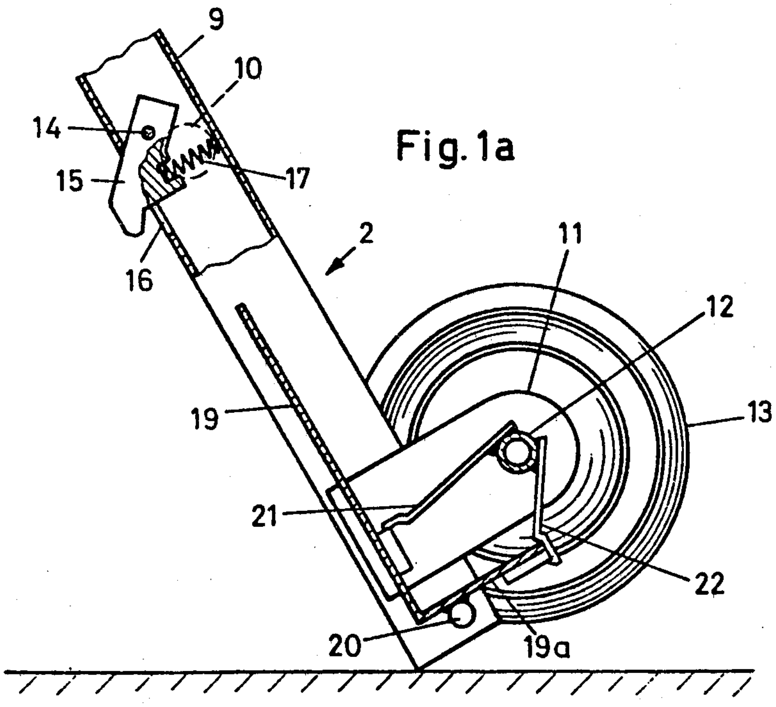
Fig. 1a

Fig. 1b
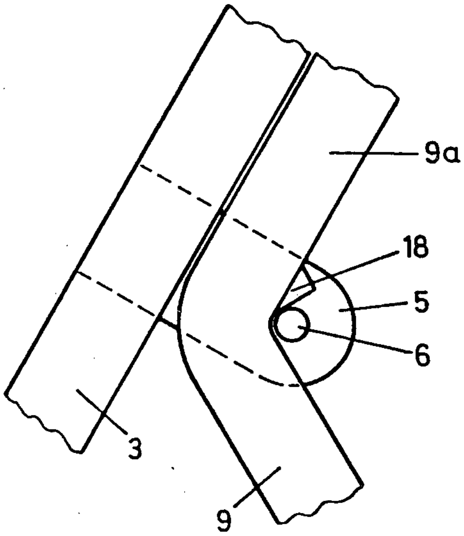
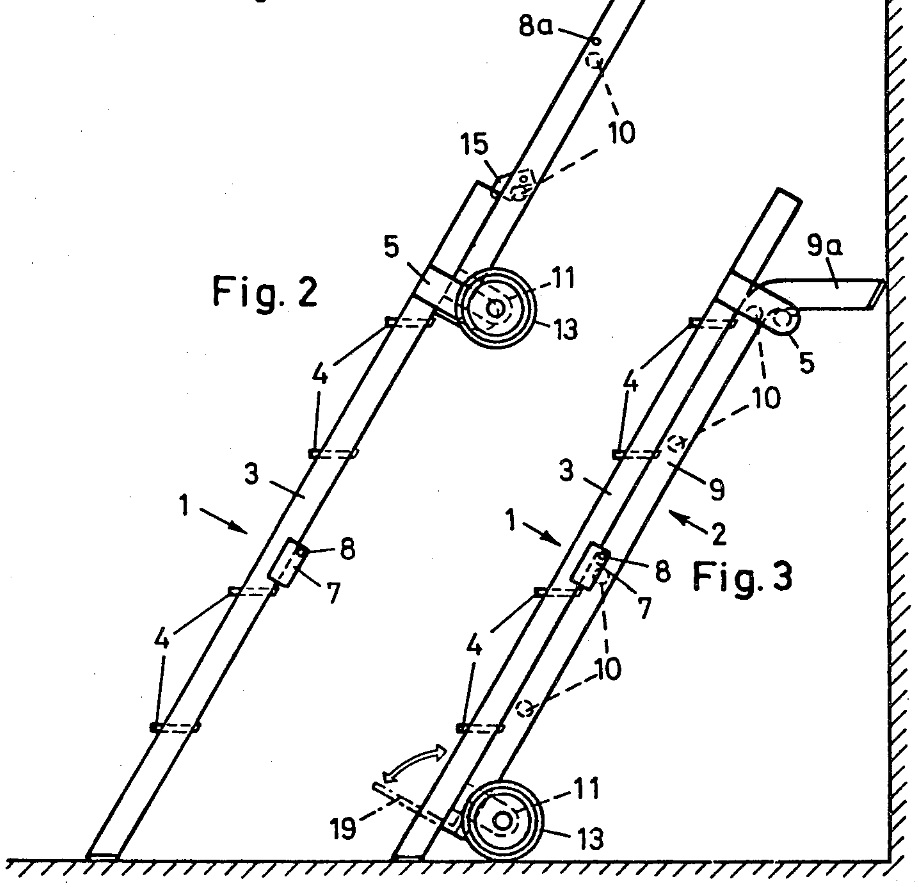
Fig. 2
Fig. 3

LADDER FORMED AS A MULTIPLE-PURPOSE DEVICE

The invention relates to a ladder formed as a multiple-purpose device comprising two separate ladder elements which can be combined to form a step-ladder and to form a leaning type ladder.

Multiple-purpose ladders are already known which are equipped with special joints so that they can be used as a step-ladder and as a leaning type ladder (CH-PS Nos. 491,278 and 611,971). It is also known to equip ladder-like scaffolds with wheels, so that they can be easily transported while in a collapsed condition (CH-PS No. 538,043).

The object of the invention is to form a simple ladder comprising two separate ladder elements in such a manner that in addition to use as a step-ladder and leaning ladder, it can also be used as a hand truck. In accordance with a further embodiment, the ladder may also be used as a four-wheeled cart.

This object is achieved according to the invention in that the side beams of the first ladder element include straps provided with holding devices, which straps guide the inserted second ladder element. The object of the invention is further achieved thereby in that the upper ends of the side beams of the second ladder element are bent, in that wheels are attached near the lower ends of the side means, and in that a support plate for loaded materials, which can be folded down from the plane of the side beams, is arranged between the wheels in such a manner that the second ladder element can be used as a hand truck, whereby the bent ends of its side beams serve as hand grips.

Figure 4:
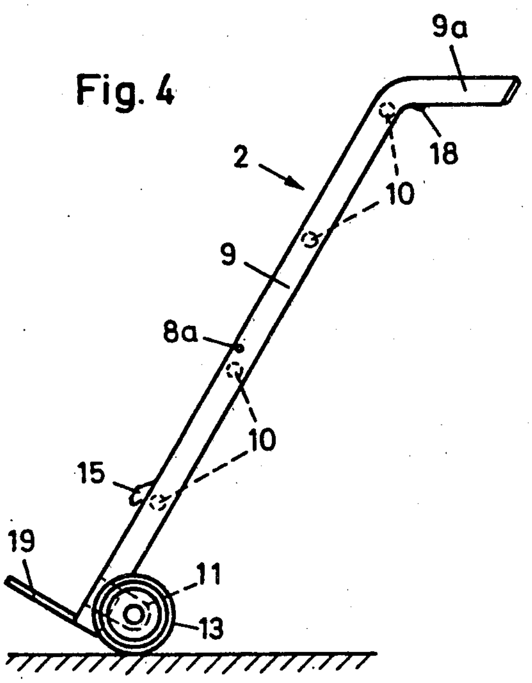
Figure 6:
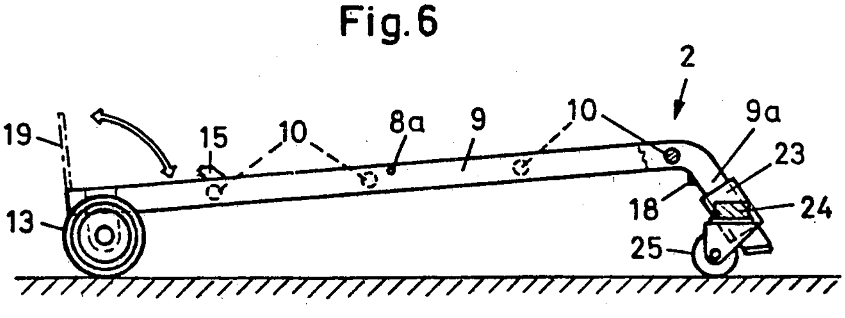
Figure 7:
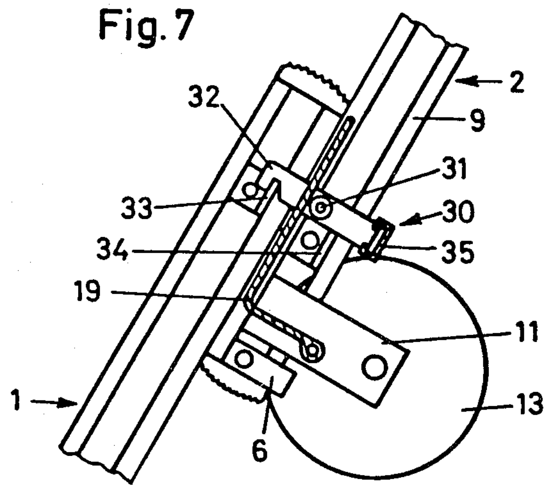
Figure 8A:
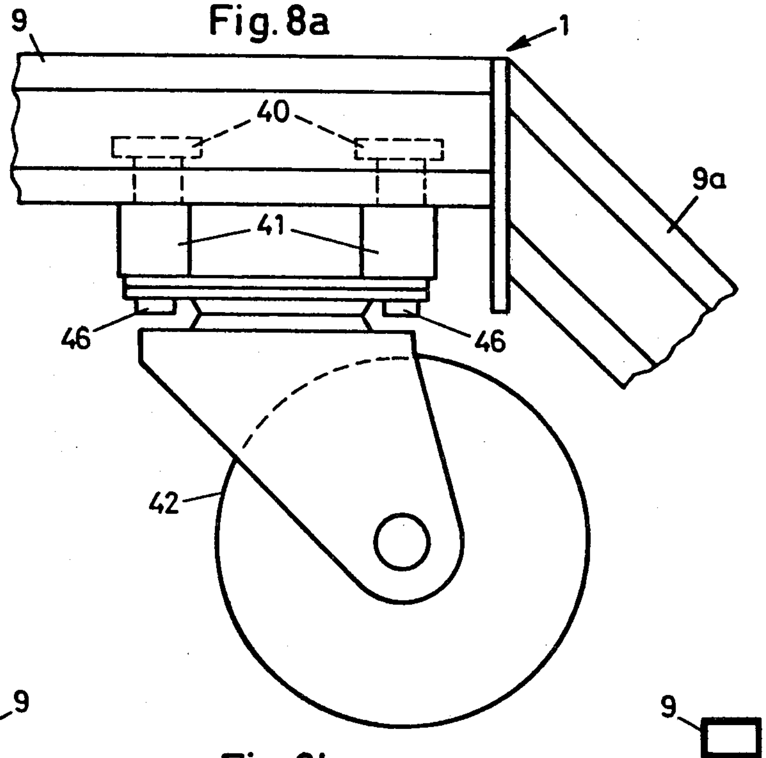
Figure 8B:
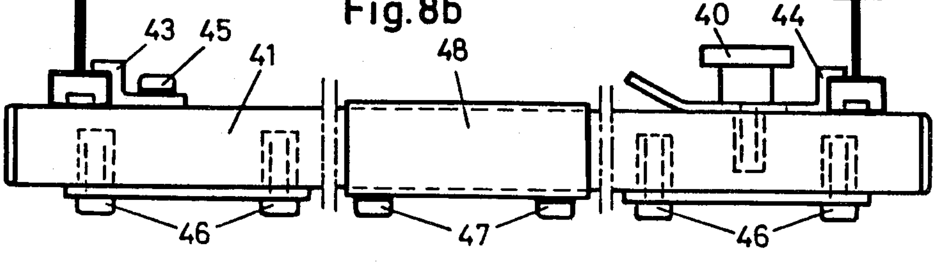

An exemplary embodiment of the object of the invention is shown in the drawing and is described in greater detail below. Shown are:

FIG. 1 a side view of the ladder according to the invention, in use as a step-ladder, FIG. 1*a* an enlarged portion of the side beam according to FIG. 2, in partial section, FIG. 1*b* an additional enlarged detail from FIG. 1, FIG. 2 a side view of the ladder in use as a leaning-type ladder, FIG. 3 a side view of the ladder in transport position, FIG. 4 a side view of the second ladder element in use as a hand truck, FIG. 5 a front view of the first ladder element, FIG. 6 a side view of the second ladder element with a supplementary device for use as a cart, FIG. 7 two side beams, partially in section, showing use of the ladder as a leaning-type ladder, FIG. 8*a* a side view of a side beam with a supplementary device for use of the ladder as a cart, and FIG. 8*b* is a partial elevation view of the two side beams shown in FIG. 8*a*.

The ladder is comprised of two separate ladder elements 1 and 2, which can be completely separated from each other. In side view the ladder element 1 shows straight side beams 3, made for example as hollow members of lightweight metal. The two side beams 3 are connected with each other by rungs 4. Near the upper end of the side beams 3, guide straps 5 are attached to the outside of the side beams 3, to which short holding devices are attached. These holding devices face each other and can be, for example, bolts. The straps 5 serve to guide and hold the ladder element 2, as will be further described below. Furthermore, a guide plate 7 having a bore 8 is attached to each side of beams 3. These plates 7 also serve to hold the ladder element 2.

The ladder element 2 includes two side beams 9, which are also made as hollow members, for example of lightweight metal. They are connected with each other by the rungs 10. The upper ends 9*a* of the two side beams 9 are bent at an angle of about 60°, as viewed from the side. Two supports 11 are attached to the insides of the lower ends of the two side beams 9, which supports 11 support an axle 12 with two wheels 13. As can be seen in FIG. 1*a*, a pawl 15 is arranged in the hollow space of each side beam 9 so as to be pivotable about a bolt 14, the hook-like end of which pawl 15 projects through an opening 16 in the side beam 9. A spring 17 biases the pawl 15 into the position shown in FIG. 1*a*. The two pawls 15 can be completely sunk into the hollow chamber of the side beam 9, however, against the pressure of the springs 17. Furthermore, both side beams 9 are provided with a rigid cam 18 in the vicinity of the bend (see FIG. 1*b*). In addition, a support plate 19 is arranged at the lower ends of the two side beams 9, which support plate 19 includes a portion 19*a*, which is bent at a 90° angle. The portion 19*a* is equipped with pivot pins 20, which are rotatably mounted in the side beams 9. The support plate 19 can be pivoted by 90° out of the position running in the plane of the side beams (FIG. 1*a*), as shown in FIG. 4. Elastic locking pawls 21,22 fix the support plate 19 in the folded and extended positions.

The various possibilities for use of the described ladder are described in greater detail below. FIG. 1 shows the ladder in the arrangement of the two ladder elements 1,2 as a step-ladder. The side beams 9 of the ladder element 2 are inserted into the guide straps 5, and the rigid cams 18 about the holding bolts 6. The bent ends 9*a* are supported against the side beams 3 of the ladder element 1. The wheels 13 do not contact the ground.

FIG. 2 shows the arrangement of the two ladder elements 1,2 as a leaning type ladder. The lower ends of the beams 9 are guided by the guide straps 5 with their bolts 6. The extended pawls 15 engage in the hollow ends of the side beams 3 of the ladder element 1. The bending of the upper ends 9*a* of the ladder element 2 assures that even the uppermost rung 10 of the ladder element 2 can be stepped on.

FIG. 3 shows the two side elements 1,2 in the transport position and in nonuse. The two plates 7 overlap the side beams 9 of the ladder element 2. The bore 8 in the plate 7 lies coaxially with a corresponding bore 8*a* in the side beams 9. The ladder elements are connected with each other by the insertion of a pin or cotter pin (not shown) into the two bores 8 and 8*a*. The pin or cotter pin can be connected with the side beam 3 by means of a short chain or the like. Another known holding device, such as a latch, could also be provided in place of the pin or cotter pin. For transport the ladder can be moved by means of the wheels.

The ladder element 2 can be completely extended from the pin straps 5 of the ladder element 1. After the support plate 19 is pivoted outward it can be used as a hand truck, in accordance with FIG. 4, whereby the ends 9*a* serve as hand grips. According to FIG. 5, the ladder element 1 can be used separately as a small leaning type ladder.

In accordance with FIG. 6 the ladder element 2 can also be used as a four-wheeled cart for piece goods by means of a simple supplementary device. The supplementary device consists of two sleeves 23, which are connected by a cross beam 24. The sleeves and the cross beam form a holder which can be placed on the ends 9*a* of the side beams 9. Two common commercial wheels 25, which swivel about vertical pivot axes in the traveling position, are mounted on the cross beam 24. The holder, if desired, could also be equipped with a tow bar (hitch).

The ladder formed as a multiple-purpose device has many uses both in the household as well as in commercial and industrial operations.

FIG. 7 shows a further variation of the pawl device 30, by means of which the first ladder element 1 and the second ladder element 2 can be combined to form a leaning type ladder according to FIG. 2. A pawl 32, which is pivotable about a bolt 31, is arranged on the inside of each side beam 9 of the ladder element 2. One end of this pawl 32 engages with an angle 33 in the first ladder element 1, and the other end thereof strikes against a stop 34 of the second ladder element 2. Both pawls 32 are connected with each other by means of cross-member 35. The pawl device 30 can be pivoted into a vertical rest position on the cross-member 35.

FIGS. 8*a* and 8*b* show a further variation of a supplementary device, by means of which the ladder element 2 can be used as a cart according to FIG. 6. The supplementary device can be placed and secured on the side beams 9 of the ladder element 2, for example in the vicinity of the ends 9*a*. The supplementary device consists of two supports 41, which can be, for example, rectangular tubes, two casters 42 screwed to the bottom of the supports 41 with flat fillister-head screws 46 and two rigidly connected cramps 43 and two slidable cramps 44, which are connected to the supports with flat fillister-head screws 45 or knurled-head screws 40. A holder 48 for a hitch can also be attached to the supports 41 by means of screws 47.

I claim:

1. A ladder formed as a multiple-purpose device comprising first and second ladder elements including side beams having upper and lower ends, said elements combinable to form a stepladder or a leaning type ladder, wherein said first ladder element side beams include straps provided with holding means for positioning and securing said second ladder element to said first element when said second element side beams are inserted through said straps, upper side beam ends of said second ladder element being curved to serve as hand grips, said second element side beams also comprising wheels attached at the lower end thereof, and a support plate including means for positioning said plate between said wheels whereby said second ladder element can be used as a hand truck.

2. A ladder according to claim 1, in which outwardly pivotable pawls are arranged in said side beams of said second ladder element, said pawls engaged in recesses or angles at the end faces of the side beams of the first ladder element when the second ladder element is extended to form a leaning type ladder.

3. A ladder according to claim 1, wherein said second ladder element includes cams located on said bent ends of said side beams of said second element in abutting relationship with said holding devices of said straps of said first ladder element when said element is in a retracted position, and said ladder elements are connected to each other by connecting means.

4. A ladder according to claim 1, wherein said support plate is arrested by elastic locking pawls when said elements are in a folded-up or outwardly pivoted position.

5. A ladder according to claim 1, wherein a holder is placed on said side beams of said second ladder element, said holder supporting two wheels which rotate about swivel axes in such a manner that said second ladder element is configured as a four-wheeled cart.

* * * * *